(12) United States Patent
Leonard et al.

(10) Patent No.: US 11,053,107 B2
(45) Date of Patent: Jul. 6, 2021

(54) JACK PAD HOLDING DEVICE AND METHOD FOR JACKING AN AIRCRAFT

(71) Applicant: Gulfstream Aerospace Corporation, Savannah, GA (US)

(72) Inventors: Patrick Leonard, Savannah, GA (US); Timothy Bago, Savannah, GA (US); James Perdue, Savannah, GA (US); Derek Shearouse, Savannah, GA (US)

(73) Assignee: Gulfstream Aerospace Corporation

( * ) Notice: Subject to any disclaimer, the term of this patent is extended or adjusted under 35 U.S.C. 154(b) by 262 days.

(21) Appl. No.: 16/189,644

(22) Filed: Nov. 13, 2018

(65) Prior Publication Data

US 2020/0148521 A1 May 14, 2020

(51) Int. Cl.
| | | |
|---|---|---|
| *B66F 13/00* | (2006.01) | |
| *B66F 7/28* | (2006.01) | |
| *F16B 47/00* | (2006.01) | |
| *B64F 1/22* | (2006.01) | |
| *F16B 37/16* | (2006.01) | |

(52) U.S. Cl.
CPC ............. *B66F 13/00* (2013.01); *B66F 7/28* (2013.01); *B64F 1/22* (2013.01); *F16B 37/16* (2013.01); *F16B 47/00* (2013.01)

(58) Field of Classification Search
CPC ....... B25B 11/00; B25B 11/005; B25B 11/06; B25B 11/0616; B60R 2011/0056; B64F 1/22; B64F 5/10; B64F 5/50; B66F 13/00; B66F 3/25; B66F 3/36; B66F 7/26; B66F 7/28; B66F 9/18; B66F 9/181; F16M 11/041; F16M 11/046; Y10S 254/00; Y10S 254/04; Y10S 254/16; F16B 37/16; F16B 47/00; F16B 47/006
USPC ................. 248/205.5, 363, DIG. 16, DIG. 4; 254/DIG. 4, DIG. 16

See application file for complete search history.

(56) References Cited

U.S. PATENT DOCUMENTS

| | | | | |
|---|---|---|---|---|
| 2,335,692 A | * | 11/1943 | Murray ..................... | B64F 5/50 414/346 |
| 2,377,530 A | * | 6/1945 | Villepigue .............. | E21D 15/54 244/129.1 |
| 3,162,066 A | * | 12/1964 | Morey ................... | B23B 49/026 408/76 |
| 3,211,425 A | * | 10/1965 | Greulich ................... | B64F 1/22 254/2 R |
| 3,543,719 A | * | 12/1970 | Pettyjohn .................. | B64F 5/10 118/50 |
| 3,709,380 A | * | 1/1973 | Cole ......................... | F41A 9/87 414/663 |
| 4,073,094 A | * | 2/1978 | Walz ......................... | B24B 7/17 125/20 |
| 5,016,850 A | * | 5/1991 | Plahn ......................... | B60J 1/20 248/206.3 |
| 5,911,395 A | * | 6/1999 | Hussaini ................. | B60R 11/00 248/206.3 |

(Continued)

*Primary Examiner* — Joseph J Hail
*Assistant Examiner* — Arman Milanian
(74) *Attorney, Agent, or Firm* — LKGlobal | Lorenz & Kopf, LLP (57) ABSTRACT

A jack pad holding devices for supporting a jack pad to an aircraft, and a method for jacking an aircraft are provided. In one non-limiting example, the jack pad holding device includes a coupler housing configured for holding the jack pad. Coupling elements are coupled to the coupler housing and are configured to couple to the aircraft.

14 Claims, 6 Drawing Sheets

(56) References Cited

U.S. PATENT DOCUMENTS

| | | | | |
|---|---|---|---|---|
| 6,637,707 B1* | 10/2003 | Gates | ............... | A47B 81/005 |
| | | | | 211/64 |
| 8,960,645 B1* | 2/2015 | Stewart | ............... | B64F 5/40 |
| | | | | 254/2 B |
| 9,038,971 B1* | 5/2015 | Guthrie | ............... | F16M 11/40 |
| | | | | 248/121 |
| 9,096,331 B2* | 8/2015 | Gehlsen | ............... | B66F 11/00 |
| 9,302,356 B2* | 4/2016 | Katzenberger | ......... | B25B 23/00 |
| 9,302,787 B2* | 4/2016 | Hafenrichter | ............ | B64F 5/30 |
| 9,580,188 B2* | 2/2017 | Endres | ............... | B64F 1/04 |
| 2005/0265711 A1* | 12/2005 | Heibel | ............... | F16M 11/42 |
| | | | | 396/419 |
| 2009/0010726 A1* | 1/2009 | Brugman | ............ | B25H 1/0078 |
| | | | | 408/1 R |
| 2009/0224117 A1* | 9/2009 | Kaneda | ............... | F16B 47/00 |
| | | | | 248/206.3 |
| 2013/0341847 A1* | 12/2013 | Bense | ............... | B64F 5/10 |
| | | | | 269/21 |
| 2016/0244307 A1* | 8/2016 | Bogert | ............... | B66F 3/36 |
| 2017/0334360 A1* | 11/2017 | Will | ............... | B60R 11/00 |

\* cited by examiner

JACK PAD HOLDING DEVICE AND METHOD FOR JACKING AN AIRCRAFT

TECHNICAL FIELD

The technical field relates generally to the jacking up of an aircraft, and more particularly, relates to jack pad holding devices for supporting a jack pad to an aircraft while jacking an aircraft and methods for jacking an aircraft.

BACKGROUND

In the aircraft industry, many components require inspection and/or service maintenance during the life of an aircraft. Often, the aircraft needs to be lifted or otherwise jacked up above the ground for performing such tasks. Jacking devices, such as, for example, tripod jacks or the like, are typically employed for lifting, hoisting or otherwise jacking the aircraft. Multiple jacking devices are positioned underneath various sections of the aircraft and are actuated to raise and/or lower the aircraft.

To ensure that the vertical forces produced by the jacking devices are effectively translated to the various intended locations of the aircraft for lifting and/or lowering the aircraft, jack pads that are configured to interface with the jacking devices are temporarily coupled to the aircraft at the various locations. The jacking devices directly engage the jack pads without contacting the aircraft to prevent damage to the aircraft, while the jack pads function to transfer loads between the jacking devices and the aircraft for vertical movement of the aircraft.

Unfortunately, there are some issues with such jacking arrangements. For example, many jack pads include vertical alignment pins and are manually positioned to an intended location against the aircraft with the vertical alignment pins being advanced into locator holes that are provided in the fuselage or skin structure of the aircraft. Each jack pad is then manually held in place against the aircraft by one technician so that the vertical alignment pins remain in the locator holes until another technician actuates the jacking device to move the jacking device's ram into contact with the jack pad to support the jack pad against the aircraft. This is inefficient, requiring multiple technicians to position and support a single jack pad at an intended location against the aircraft.

Another issue can occur when the aircraft is jacked up or is being jacked up and for various reasons, a certain section of the aircraft, e.g., nose section, gets light or slightly lifts (e.g., ¼ to ½ an inch of unintended vertical displacement), thereby causing the vertical alignment pins of the jack pads to come out of the locator holes and shift laterally relative to the locator holes. When the aircraft settles back down, the vertical alignment pins of the jack pad advance back up into the fuselage or skin structure misaligned with the locator holes, causing damage to the aircraft structure.

Accordingly, it is desirable to provide a device for supporting a jack pad in position against an aircraft and a method for using such a device for jacking an aircraft. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a jack pad holding device for supporting a jack pad to an aircraft, and various non-limiting embodiments of a method for jacking an aircraft, are provided herein.

In a first non-limiting embodiment, the jack pad holding device includes, but is not limited to, a coupler housing configured for holding the jack pad. The jack pad holding device further includes, but is not limited to, a plurality of coupling elements coupled to the coupler housing and configured to couple to the aircraft.

In another non-limiting embodiment, the method includes, but is not limited to, the step of positioning a jack pad adjacent to the aircraft. The method further includes, but is not limited to, the step of disposing the jack pad in a jack pad holding device. The method further includes, but is not limited to, the step of coupling the jack pad holding device to the aircraft to support the jack pad to the aircraft. The method further includes, but is not limited to, the step of moving the jack pad with a jacking device to jack the aircraft.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to jack pad holding devices for retaining or otherwise supporting a jack pad to an aircraft and methods for jacking an aircraft. The exemplary embodiments taught herein provide a jack pad holding device that includes a coupler housing. The coupler housing is configured to hold a jack pad. Coupling elements are coupled to the coupler housing and are configured to couple the coupler housing to the aircraft.

In an exemplary embodiment, a jack pad is positioned against or otherwise held to the aircraft and is arranged in the jack pad holding device. In one example, the jack pad is positioned at an intended location to the aircraft, for example, by advancing vertical alignment pins of the jack pad into locator holes that are provided in the fuselage or skin structure of the aircraft. Next, the jack pad holding device is positioned or otherwise arranged about the jack pad such that the jack pad is held or otherwise supported in the coupler housing against the aircraft. In another example, the jack pad is arranged in the jack pad holding device such that the jack pad is held or otherwise supported in the coupler housing. Next, the jack pad holding device including the jack pad is arranged against the aircraft such that the jack pad is positioned at an intended location to the aircraft, for example by advancing the vertical alignment pins of the jack pad into locator holes that are provided in the fuselage or skin structure of the aircraft.

The jack pad holding device is coupled to the aircraft, thereby applying positive pressure to the jack pad to support the jack pad at its intended location to the aircraft so that, for example, the vertical alignment pins remain in the locator holes without requiring the jack pad to be manually held in position. A jacking device is actuated to move the jacking device's ram into contact with the jack pad and to move the jack pad vertically, thereby jacking the aircraft. In an exemplary embodiment, it has been found that by supporting the jack pad in position against the aircraft using the jack pad holding device, a single technician can efficiently position a jack pad at an intended location against the aircraft and then be free to move away from the jack pad to actuate a jacking device for moving the jacking device's ram into contact with the jack pad. Further, it has been found that by supporting the jack pad in position against the aircraft using the jack pad holding device, if a certain section of the aircraft happens to get light or otherwise slightly lift when the aircraft is jacked up or is being jacked up, the jack pad does not shift relative to its intended location, thereby preventing any damage to the aircraft structure when the aircraft settles back down.

Figure 1:
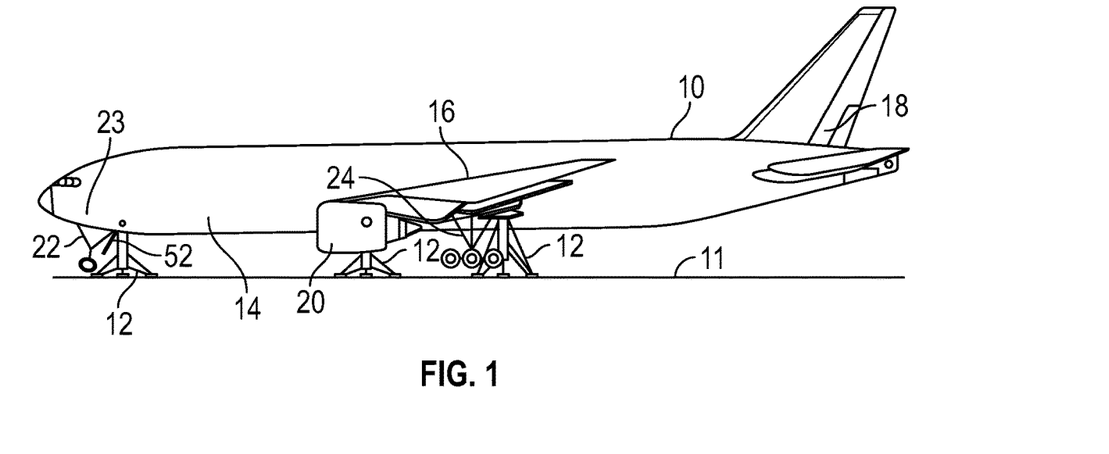
FIG. 1 illustrates a side view of an aircraft that has been jacked by a plurality of jacking devices in accordance with an exemplary embodiment.

FIG. 1 illustrates a side view of an aircraft 10 that has been jacked up and is being supported above the ground 11 by a plurality of jacking devices 12 e.g., tripod jacks or the like, in accordance with an exemplary embodiment. The aircraft 10 includes a fuselage 14 as the main body of the aircraft 10 that supports the wings 16 and tail 18. Depending on the design of the aircraft 10, the engines 20 may be attached to the wings 16, or alternatively, to the fuselage 14. As illustrated, the aircraft 10 includes landing gears 22 and 24 that are deployed in the extended positions. The landing gears 22 and 24 include a nose landing gear 22 disposed under a nose section 23 of the fuselage 14 and main landing gears 24 disposed under the wings 16 of the aircraft 10.

Figure 2:
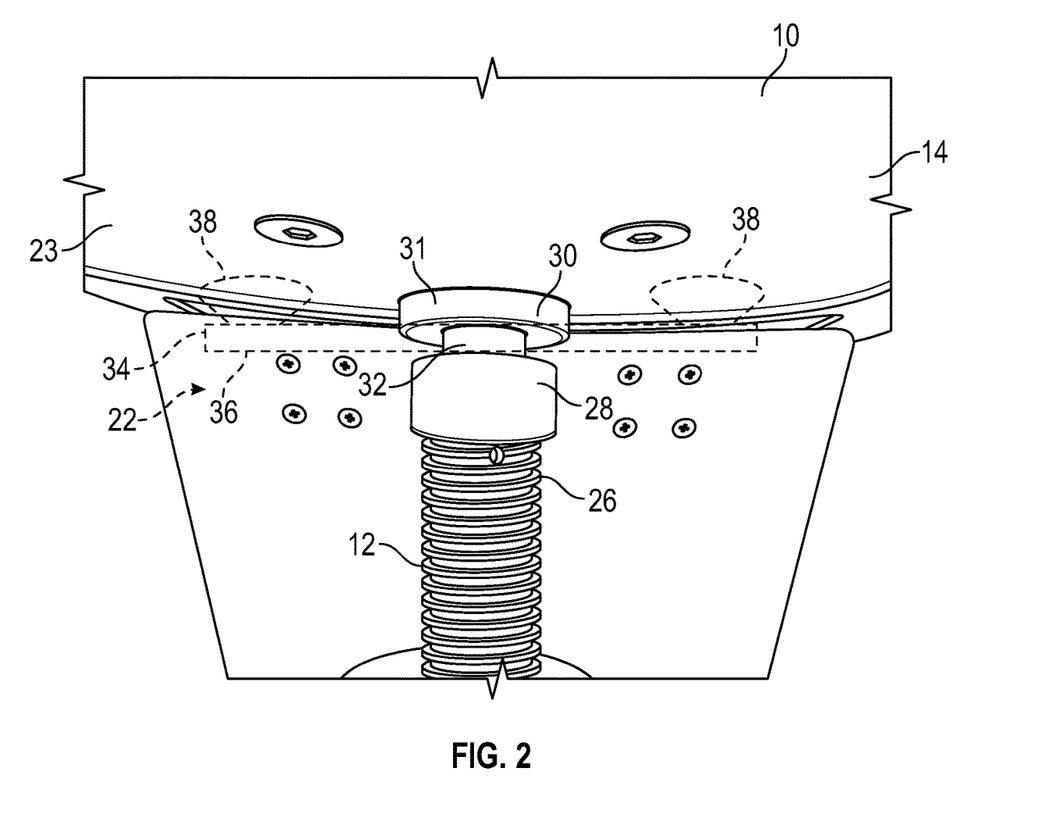
FIG. 2 illustrates a perspective lower rear view of a forward portion of an aircraft and includes a jack pad holding device, a jack pad, and a portion of a jacking device in accordance with an exemplary embodiment.
Figure 3:
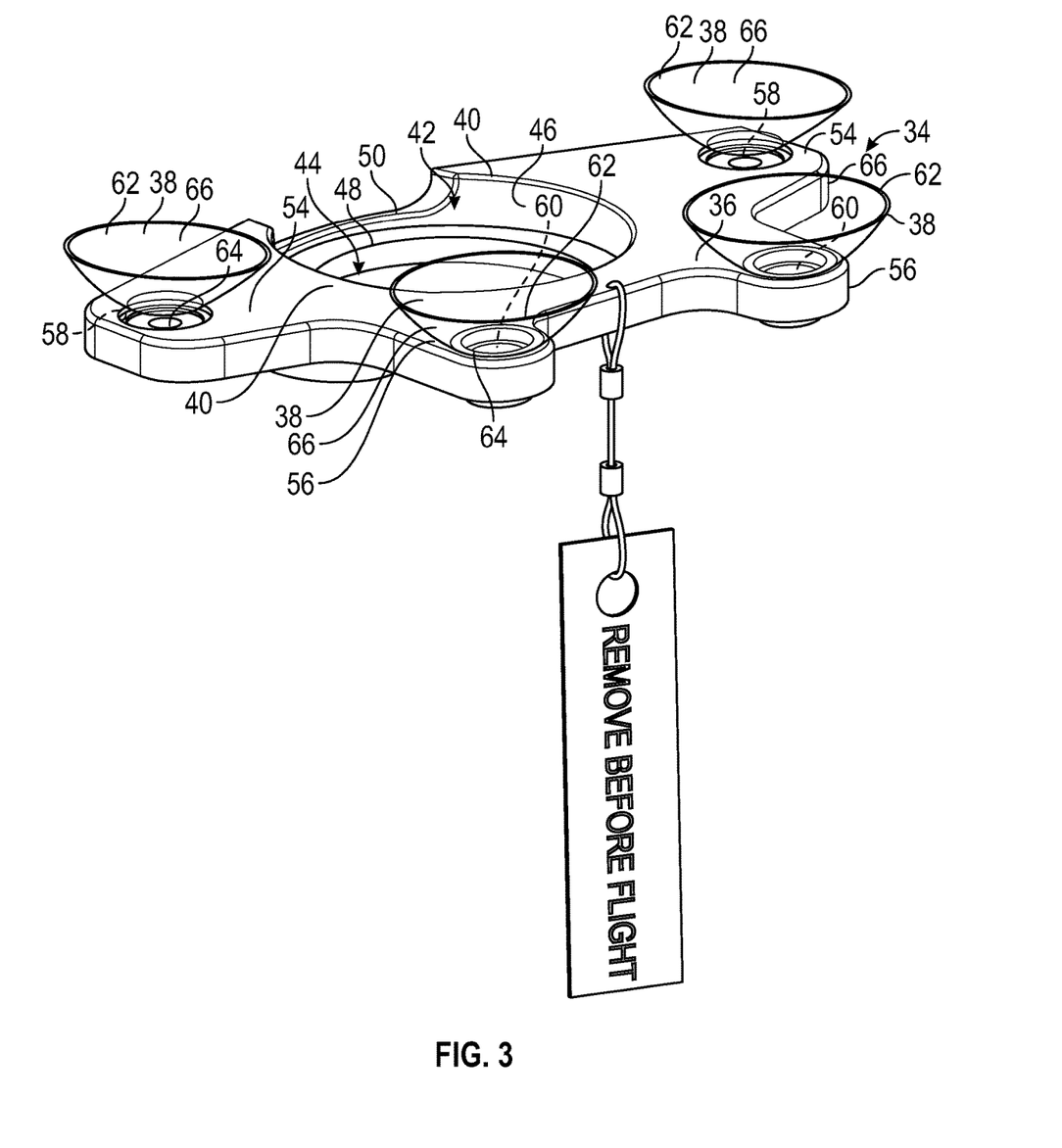
FIG. 3 illustrates a perspective top view of a jack pad holding device in accordance with an exemplary embodiment.
Figure 4:
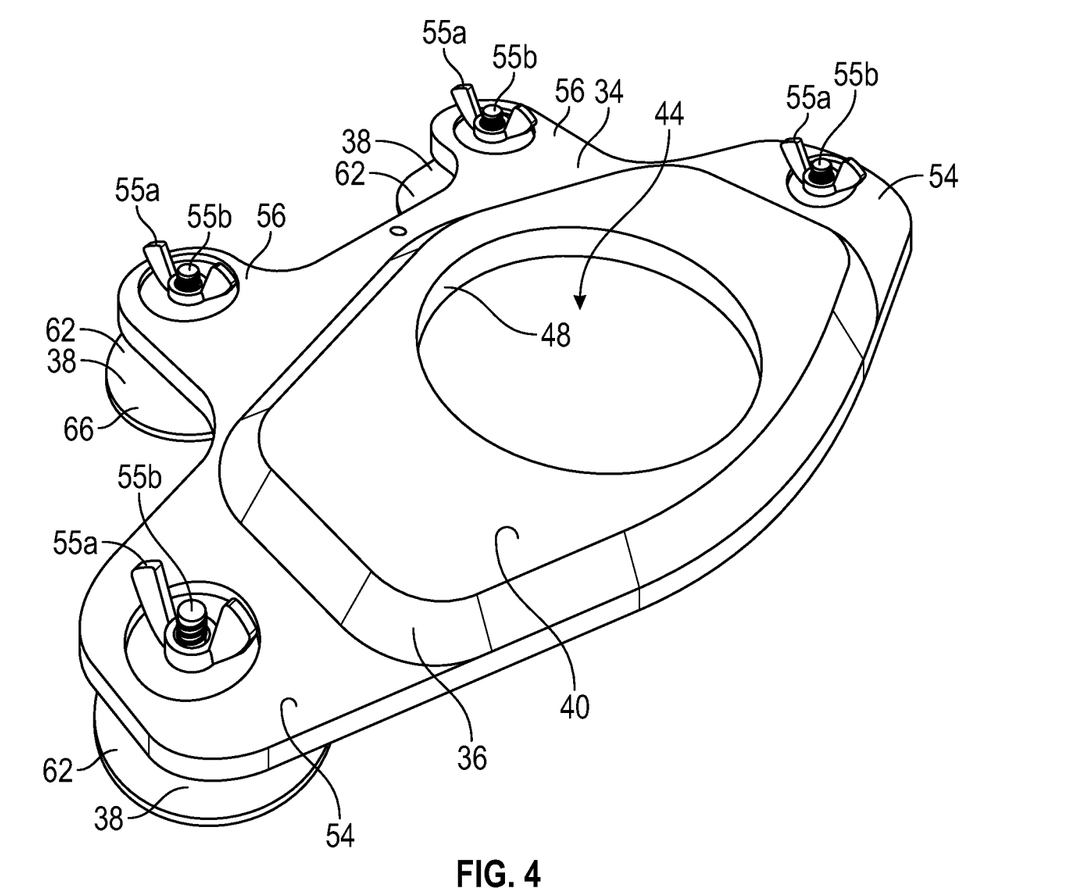
FIG. 4 illustrates a perspective bottom view of a jack pad holding device in accordance with an exemplary embodiment.
Figure 5:
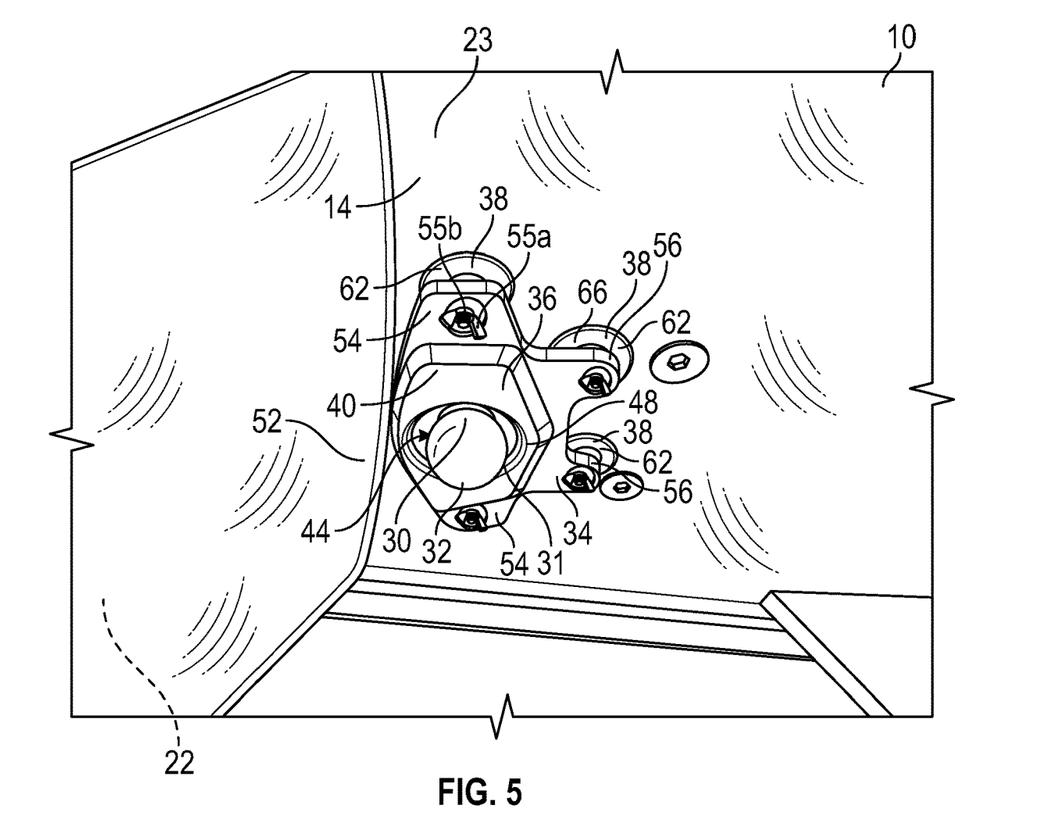
FIG. 5 illustrates a perspective bottom rear view of a forward portion of an aircraft and includes a jack pad holding device and a jack pad in accordance with an exemplary embodiment.

Referring also to FIG. 2, the jacking devices 12 each include a ram 26 having a distal end sections 28 that is in contact with a jack pad 30. In an exemplary embodiment, the jack pad 30 has a base portion 31 with vertical alignment pins (not shown) extending upwardly into locator holes (not shown) provided in the fuselage 14 or skin structure of the aircraft 10. A jack engagement portion 32 extends downwardly from the base portion 31. The distal end section 28 of the ram 26 is cooperatively configured with the jack engagement portion 32 to be received into engagement with the distal end section 28 of the ram 26 when the ram 26 is brought into contact with the jack pad 30. In one example, the jack engagement portion 32 (see also FIG. 5) includes a ball feature extending downwardly from a neck that is coupled to the base portion 31 of the jack pad 30 in which the ball feature is received into an opening, socket, or pocket formed in the distal end section 28 of the ram 26.

Referring to FIGS. 1-5, the jack pad 30 is supported to the aircraft 10 by a jack pad holding device 34. In an exemplary embodiment, the jack pad holding device 34 is configured to apply positive pressure to the jack pad 30 to hold the jack pad 30 against the aircraft 10 allowing limited or substantially no relative movement between the jack pad 30 and the aircraft 10.

The jack pad holding device 34 includes a coupler housing 36 configured for holding the jack pad 30, and a plurality of coupling elements 38 coupled to the coupler housing 36 and configured to removably couple to the aircraft 10. In an exemplary embodiment, the coupler housing 36 is formed of a relatively rigid material, such as a plastic material, composite material, or a metal material, such as a relatively rigid plastic material, for example high density polyethylene (HDPE) or the like.

In an exemplary embodiment, the coupler housing 36 includes a jack pad holder portion 40 having a pocket 42 formed therein for receiving and holding the jack pad 30. An opening 44 is formed through the pocket 42 to allow the jack pad 30 to be accessible from outside the jack pad holding device 34 (shown in FIG. 5).

The jack pad holder portion 40 has a pocket sidewall 46 defining the pocket 42. In an exemplary embodiment, the pocket 42 is size to substantially match an outer profile of the base portion 31 of the jack pad 30. In one example, the pocket 42 is sized to define a nominal gap of from about 0.02 to about 0.1 mm between the base portion 31 of the jack pad 30 and the pocket sidewall 46 to limit relative lateral movement between the jack pad 30 and the jack pad holder portion 40.

As illustrated, the jack pad holder portion 40 has a lip 48 that extends inwardly from the pocket sidewall 46 towards the opening 44 to create a step that retains the jack pad 36 in the coupler housing 36 when the jack pad holding device 34 is disposed against the fuselage 14, thereby preventing the jack pad 36 from falling through the opening 44. In an exemplary embodiment, the opening 44 has a diameter of from about 25 to about 75 mm to facilitate accessing the jack pad with the jacking device 12 from outside the jack pad holding device.

As illustrated, optionally the pocket sidewall 46 defined a relief 50 in a forward section of the of the jack pad holder portion 40 adjacent to the pocket 42. Depending upon the design of the aircraft 10, the relief 50 allows the jack pad holding device 34 to be positioned substantially close to the landing gear door 52 that is configured to swing rearward to allow the landing gear 22 or 24 to be fully deployed.

In an exemplary embodiment, the coupler housing 36 includes a plurality of coupling member portions 54 and 56 extending outwardly from the jack pad holder portion 40. As illustrated, the coupling elements 38 are correspondingly coupled to the coupling member portions 54 and 56. In an exemplary embodiment, the coupling elements 38 are attached to the coupling member portions 54 and 56 by fastening elements 55a-55b, e.g., threaded fasteners such as screws and nuts, for example thumbscrews and nylon nuts or the like, wing nut or the like, or any other threaded fasteners or combinations thereof known to those skilled in the art.

As illustrated, the pair of coupling member portions 54 extend laterally outward from the jack pad holder portion 40 in generally opposite directions. The coupling member portions 54 each have a coupling element mounting surface 58 that correspondingly supports one of the coupling elements 38. In an exemplary embodiment, the coupling element mounting surfaces 58 tilt inwardly generally towards each other at angles such as from about 2° to about 6°, for example about 4°. Likewise, the coupling member portions 56, which extend outward from the jack pad holder portion 40 in generally rearward directions, each have a coupling element mounting surface 60 that support one of the coupling elements 38. In an exemplary embodiment, the coupling element mounting surfaces 60 tilt inwardly generally towards each other at angles such as from about 1° to about 3°, for example about 2°. In an exemplary embodiment, by tilting the coupling element mounting surfaces 58 and 60 inwardly, the coupling elements 38 are positioned or otherwise oriented inwardly to more effectively grab or coupled to the curved outer skin of the aircraft 10, for example to the outer surface of the fuselage 14.

In an exemplary embodiment, the coupling elements 38 are configured as suction cups 62. The suction cups 62 have a base portion 64 that is mounted on and coupled to the corresponding coupling element mounting surfaces 58 and 60 as discussed above. Further, the suction cups 62 have cups 66 that extend upwardly from the base portions 64 so as to face in directions opposite the corresponding coupling member portions 54 and 56. The cups 66 are relatively flexible, e.g., formed of an elastomeric, polymeric, a rubber material, and can be depressed against the outer skin of the aircraft 10 for removably coupling to the aircraft 10.

Figure 6:
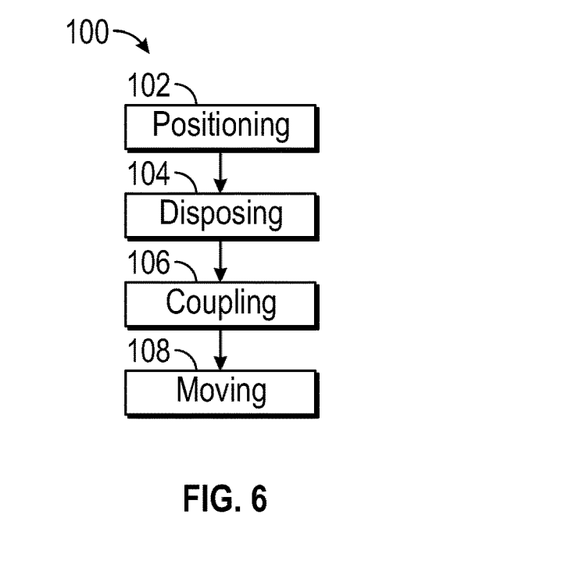
FIG. 6 illustrates a method for jacking an aircraft in accordance with an exemplary embodiment.

Referring to FIG. 6, a method 100 for jacking an aircraft is provided. The method 100 includes positioning (STEP 102) a jack pad to the aircraft. The jack pad is disposed (STEP 104) in a jack pad holding device. In one example, the jack pad holding device includes a coupler housing with a jack pad holder portion that has a pocket formed therein. The jack pad is disposed in the pocket of the coupler housing. In another example, the jack pad holder portion has an opening formed through the pocket. The jack pad is positioned in the pocket of the coupler housing with a jack engagement portion of the jack pad extending through the opening and outside of the jack pad holding device.

The jack pad holding device is coupled (STEP 106) to the aircraft to support the jack pad to the aircraft. In one example, the jack pad holding device incudes a plurality of coupling elements coupled to the coupler housing. The coupling elements are coupled to the aircraft to support the jack pad to the aircraft. In another example, the coupling elements are configured as suction cups each having cup. Coupling the jack pad holding device to the aircraft includes depressing the cups against the aircraft to couple the suction cups to the aircraft.

The jack pad is moved (STEP 108) with a jacking device to jack the aircraft. In one example, moving the jack pad with the jacking device includes contacting the jack engagement portion of the jack pad with the jacking device.

Figure 7:
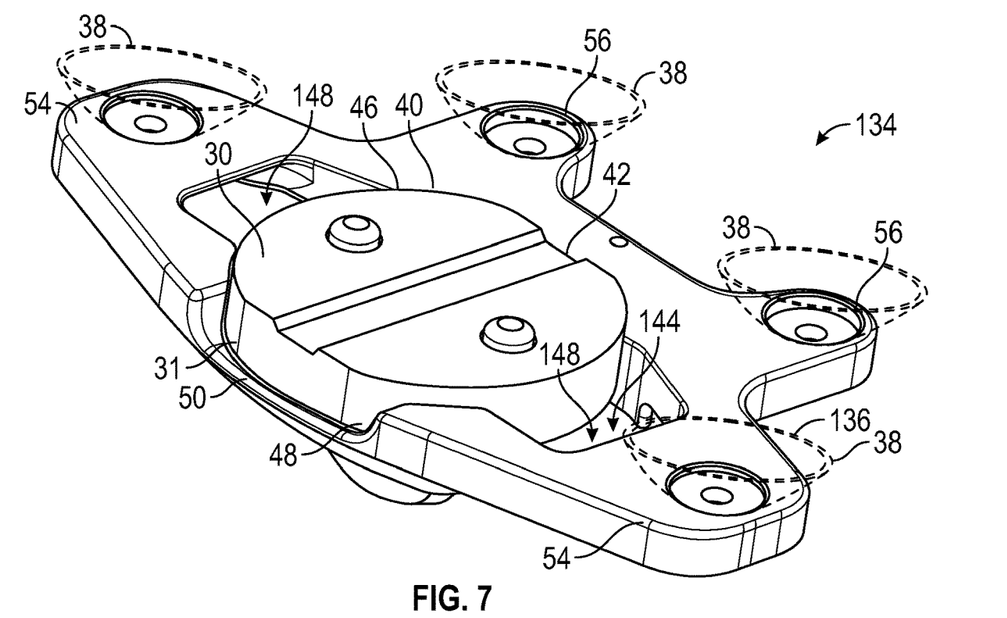
FIG. 7 illustrates a perspective view of a coupler housing of a jack pad holding device and a jack pad in accordance with another exemplary embodiment.
Figure 8:
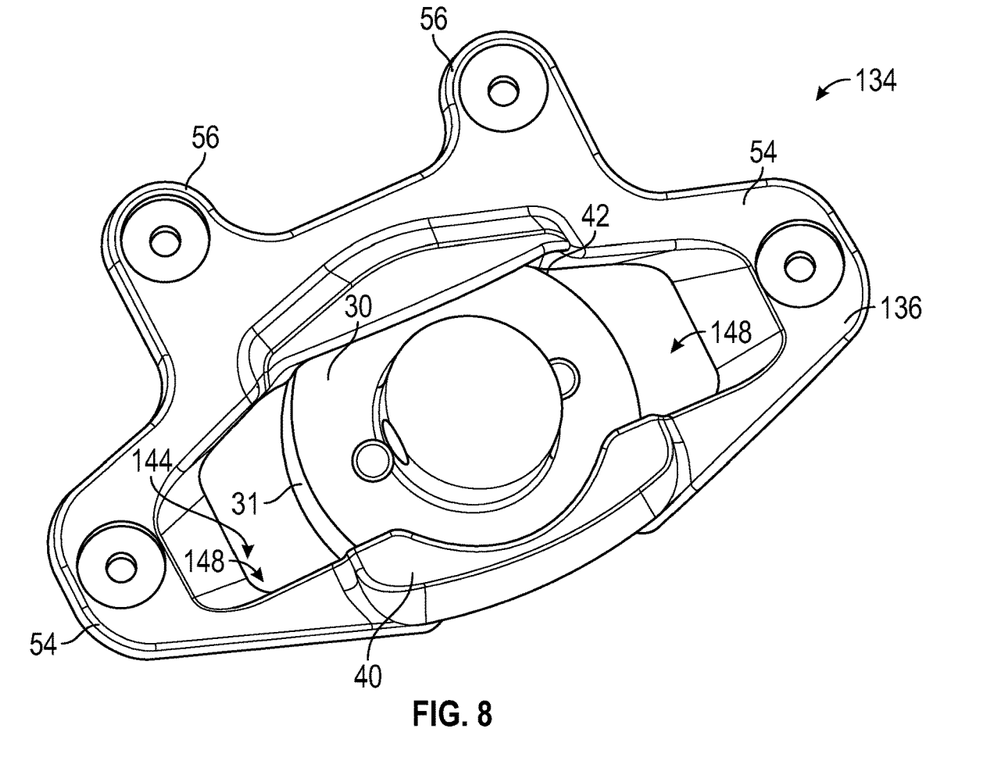
FIG. 8 illustrates a perspective view of a coupler housing of a jack pad holding device and a jack pad in accordance with another exemplary embodiment.
Figure 9:
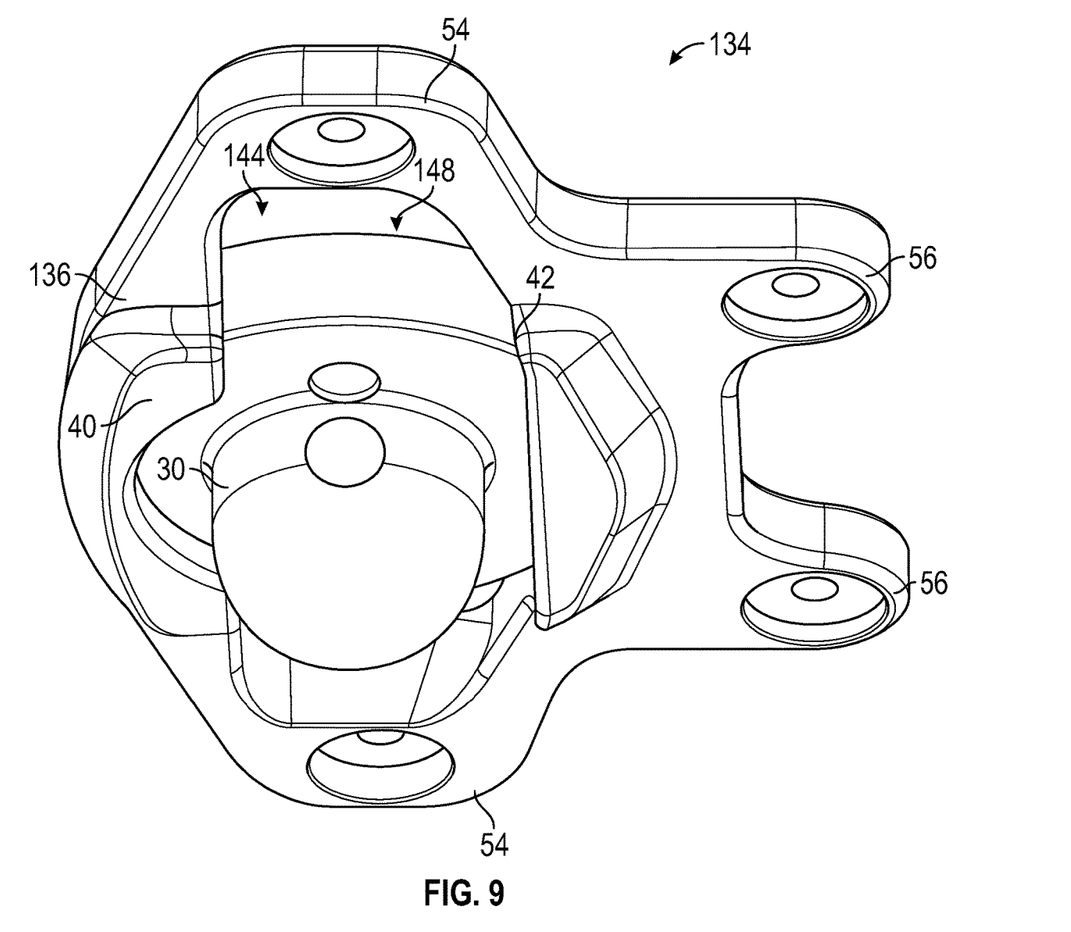
FIG. 9 illustrates a perspective view of a coupler housing of a jack pad holding device and a jack pad in accordance with another exemplary embodiment.

Referring to FIGS. 7-9, a jack pad holding device 134 including a coupler housing 136 in accordance with another exemplary embodiment is provided. The jack pad holding device 134 is similarly configured to the jack pad holding device 34 as illustrated in FIGS. 2-5 including the coupler housing 36, the coupling elements 38, the jack pad holder portion 40, the pocket 42, the pocket sidewall 46, the lip 48, and the relief 50, but with the exception that the coupler housing 136 has an enlarged opening 144 relative to the opening 44 of the jack pad holding device 34. In an exemplary embodiment, the enlarged opening 144 includes lateral opening portions 148 that extend laterally outward from the jack pad holder portion 40 towards the coupling member portions 54. As such, the lateral opening portions 148 of the enlarged opening 144 advantageously allows enhanced visibility by a technician(s) of the jack pad 30 including the base portion 31 to be able to hold the jack pad 30 all the way through the installation to the aircraft 10 and further, allows enhanced visibility throughout the entire jacking event.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A jack pad holding device for supporting a jack pad to an aircraft, the jack pad holding device comprising:
    a coupler housing configured for holding the jack pad, wherein the coupler housing includes a jack pad holder portion having a pocket formed therein for holding the jack pad and an opening formed through the pocket to allow the jack pad to be accessible from outside the jack pad holding device, wherein the coupler housing includes a plurality of coupling member portions that extend outwardly from the jack pad holder portion, wherein the plurality of coupling member portions includes a first pair of coupling member portions extending laterally outward from the jack pad holder portion in generally opposite directions, and wherein the opening is an enlarged opening including lateral opening portions that extend laterally outward from the jack pad holder portion correspondingly towards the first pair of coupling member portions; and
    a plurality of coupling elements coupled to the coupler housing and configured to couple to the aircraft, and wherein the coupling elements are correspondingly coupled to the coupling member portions.

2. The jack pad holding device of claim 1, wherein the jack pad holder portion has a pocket sidewall defining the pocket that is sized to substantially match a base portion of the jack pad.

3. The jack pad holding device of claim 2, wherein the pocket is sized to define a nominal gap of from about 0.02 to about 0.1 mm between the base portion of the jack pad and the pocket sidewall.

4. The jack pad holding device of claim 2, wherein the jack pad holder portion has a lip that extends from the pocket sidewall towards the opening to facilitate retaining the jack pad in the coupler housing.

5. The jack pad holding device of claim 1, wherein the opening has a diameter of from about 25 to about 75 mm to facilitate accessing the jack pad from outside the jack pad holding device.

6. The jack pad holding device of claim 1, further comprising a plurality of threaded fasteners that correspondingly attach the coupling elements to the coupling member portions of the coupler housing.

7. The jack pad holding device of claim 1, wherein the coupling elements are configured as suction cups that are coupled to the coupling member portions and that have cups correspondingly facing in directions opposite the coupling member portions for coupling to the aircraft.

8. A jack pad holding device for supporting a jack pad to an aircraft, the jack pad holding device comprising:

a coupler housing configured for holding the jack pad, wherein the coupler housing includes a jack pad holder portion having a pocket formed therein for holding the jack pad and an opening formed through the pocket to allow the jack pad to be accessible from outside the jack pad holding device, wherein the coupler housing includes a plurality of coupling member portions that extend outwardly from the jack pad holder portion, wherein the plurality of coupling member portions includes a first pair of coupling member portions extending laterally outward from the jack pad holder portion in generally opposite directions; and a plurality of coupling elements coupled to the coupler housing and configured to couple to the aircraft, wherein the coupling elements are correspondingly coupled to the coupling member portions, wherein the first pair of coupling member portions have coupling element mounting surfaces that correspondingly support the coupling elements and that are tilted inwardly generally towards each other at angles of from about 2° to about 6°.

9. The jack pad holding device of claim 1, wherein the plurality of coupling member portions includes a second pair of coupling member portions extending outward from the jack pad holder portion in generally rearward directions.

10. The jack pad holding device of claim 9, wherein the second pair of coupling member portions have coupling element mounting surfaces that correspondingly support the coupling elements and that are tilted inward generally towards each other at angles of from about 1° to about 3°.

11. The jack pad holding device of claim 1, wherein the jack pad holder portion has a pocket sidewall that defines the pocket and that has a forward section that defines a relief adjacent to the pocket.

12. A method for jacking an aircraft, the method comprising the steps of:

positioning a jack pad adjacent to the aircraft;

disposing the jack pad in a jack pad holding device, wherein the jack pad holding device comprises a coupler housing including a jack pad holder portion having a pocket formed therein, and wherein disposing the jack pad in the jack pad holding device further comprises disposing the jack pad in the pocket of the coupler housing, wherein the jack pad holder portion has an opening formed through the pocket, and wherein disposing the jack pad in the jack pad holding device further comprises positioning the jack pad in the pocket of the coupler housing with a jack engagement portion of the jack pad extending through the opening and outside of the jack pad holding device;

coupling the jack pad holding device to the aircraft to support the jack pad to the aircraft; and moving the jack pad with a jacking device to jack the aircraft.

13. The method of claim 12, wherein the jack pad holding device comprises a plurality of coupling elements coupled to the coupler housing, and wherein coupling the jack pad holding device to the aircraft comprises coupling the coupling elements to the aircraft.

14. The method of claim 13, wherein the coupling elements are configured as suction cups having cups, and wherein coupling the jack pad holding device to the aircraft comprises depressing the cups against the aircraft to couple the suction cups to the aircraft.

* * * * *